June 25, 1957 W. R. BENNETT 2,797,340

MULTIPLE QUANTIZED FEEDBACK IN A REGENERATIVE REPEATER

Filed April 10, 1956 3 Sheets-Sheet 1

INVENTOR
W. R. BENNETT
BY Harry C. Hart
ATTORNEY

MULTIPLE QUANTIZED FEEDBACK IN A REGENERATIVE REPEATER

Filed April 10, 1956 3 Sheets-Sheet 2

INVENTOR
W. R. BENNETT
BY Harry C. Hart
ATTORNEY

June 25, 1957 W. R. BENNETT 2,797,340

MULTIPLE QUANTIZED FEEDBACK IN A REGENERATIVE REPEATER

Filed April 10, 1956 3 Sheets-Sheet 3

INVENTOR
W. R. BENNETT
BY Harry C. Hart
ATTORNEY

United States Patent Office 2,797,340

Patented June 25, 1957

2,797,340

MULTIPLE QUANTIZED FEEDBACK IN A REGENERATIVE REPEATER

William R. Bennett, Summit, N. J., assignor to Bell Telephone Laboratories, Incorporated, New York, N. Y., a corporation of New York Application April 10, 1956, Serial No. 577,230

9 Claims. (Cl. 307—106)

This invention relates to communication by transmission of trains of pulses and particularly to the full regeneration both in amplitude and in time of two-valued pulses which have been distorted in the course of such transmission.

Physically realizable transmission channels for electrical pulse signals subjects those pulse signals to a distortion of greater or less degree. This distortion may be either linear or nonlinear. In the former case no new frequency components are produced by the transmission channel and the principle of superposition applies, that is to say, waves of several different frequencies which are simultaneously present add algebraically to give a resultant wave. When the distortion is nonlinear there is a multiplication of the transmitted frequency components which produces, in the resultant wave, new frequency components corresponding to the products. This invention deals only with linear distortion.

A particular form of linear distortion may result from a transmission channel's inability to transmit direct currents. This inability gives rise to a decay in the envelope of signals which have been transmitted over this kind of channel. This type of decay, graphically termed a "wandering zero," when impressed upon signals arriving at a receiving input point, may render those signals either above or below the threshold of recognition without regard to the presence or absence of signal pulses.

Linear distortion of other, nonzero frequency components by a transmission channel similarly leads to other forms of pulse degradation. It may result in a rounded leading edge on an arriving pulse. This rounding may be of such a time characteristic that the threshold level at which the pulse is recognized may not be achieved within the time interval allotted to the recognition of that pulse. On the other hand, a transient tail on the trailing edge of a pulse may extent into the time interval allotted to a succeeding pulse and thus prevent a receiving device from making any electrical distinction between the two pulses. And all three effects, the "zero wander," the rounded leading edge and the extended trailing edge may join to render a signal electrically unrecognizable.

It is well known that, provided the degradation of a pulse form has not proceeded too far, an individual pulse, and hence a train of such pulses, may be completely restored to its original form by a regeneration which wipes out all accumulated noise and all types of distortion, linear and nonlinear. The principal element of pulse regeneration apparatus of a preferred type is a regenerative repeater which is tripped or triggered by each incoming pulse, preferably as it passes through a threshold level which corresponds to one-half its nominal amplitude.

Insertion of such regenerative repeaters along a transmission channel, at points where waveform degradation has not proceeded too far, restores the individual pulses to their original form and eliminates all distortion. But this restoration is dependent upon the triggering of the regenerative repeater with definiteness and certainty in accordance with the original signal. This definiteness and certainty is prejudiced by the linear distortion above discussed.

L. R. Wrathall Patent 2,703,368, of March 1, 1955, discloses a device which reduces considerably the aforementioned "zero wander" form of distortion. It is the principal object of this invention, however, to increase the certainty with which transmitted binary pulses may be regenerated. Toward this increased certainty the invention adopts the subordinate objectives of eliminating distortions which may contribute to the "zero wander" and of correcting the rounded leading edges and extended pulse tails which may, as well as the "zero wander," cause uncertain triggering of a regenerative repeater. The invention achieves these objectives in part by balancing out at a receiving input point not only one, but any or all the individual decay components which collectively degrade the arriving pulse trains.

In accordance with a feature of the invention the balancing energy is derived from a pulse repeater.

A further feature of the invention lies in the dissimilar shaping networks provided to deliver this energy to the repeater input point in preassigned waveforms. These waveforms are characterized by time constants corresponding respectively to those of the individual pulse-distorting wave components. Suitable means are provided to combine these balancing waves in appropriate time, phase, and amplitude relationship with incoming pulse trains such that the balancing energy waves cooperatively unite to counterbalance linear distortion effects upon the arrival pulse train. After this counterbalancing, the arriving pulse train is free of the degradation defects discussed above and can trigger the pulse repeater with certainty.

To regenerate the pulses in time the invention provides apparatus which is simple in construction and reliable in operation. In brief, a pulse repeater is employed, complete with a timing circuitry which is adapted to establish a fixed time relation between arriving trigger signals and output pulses. A plurality of dissimilar feedback paths apply compensating energy from the repeater's output pulses to the input point. These paths are each constructed to provide at least a partial compensation for one of the many degradation components affecting the arrival wave and jointly, with others of the same plurality, to provide a full compensation for the many varied forms of linear distortion which impair informational accuracy of arriving pulse trains.

The invention will be more fully apprehended from the following description of preferred embodiments thereof taken in conjunction with the appended drawings, in which:

Fig. 1 diagrams a simple embodiment of the invention employed in a pulse transmission system;

Figure 1:
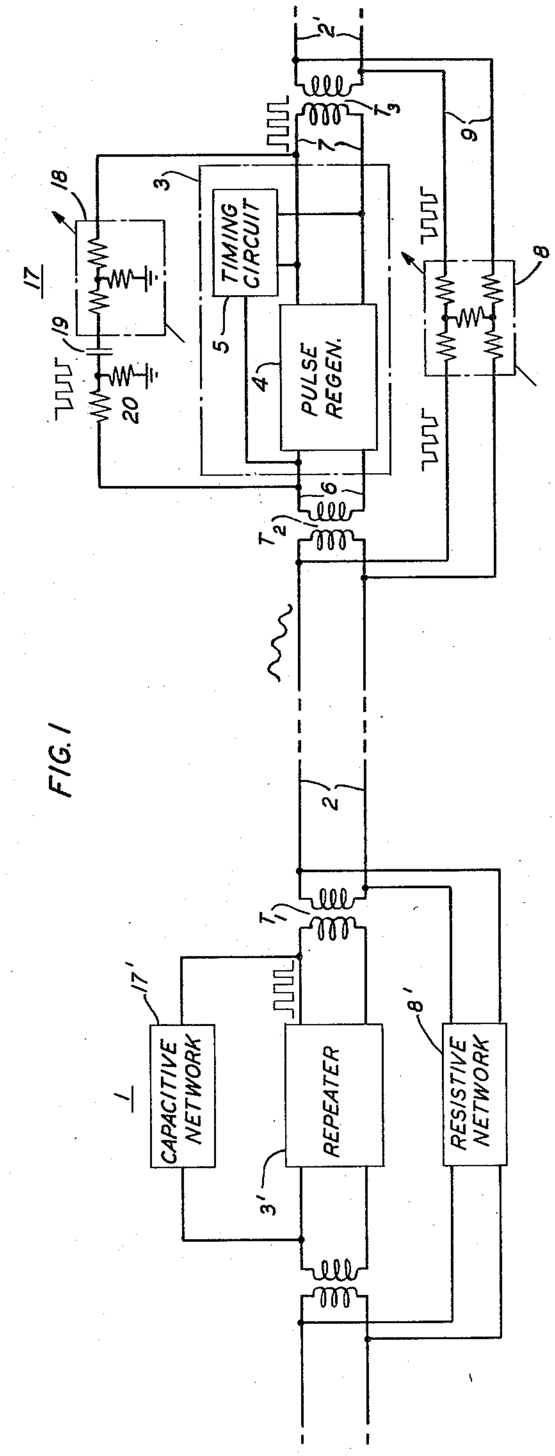

Referring more particularly to the drawings, Fig. 1 shows a source 1 of a train of pulse signals, comprising a pulse repeater 3' and associated networks 8' and 17', coupled through an output transformer $T_1$ to a transmission line 2 which is terminated at its opposite end by an input transformer $T_2$. This input transformer serves as a coupling to a regenerative pulse repeater 3 such as disclosed in the aforementioned Wrathall patent. The repeater includes a pulse regenerator 4 and an oscillatory timing circuit 5. The latter circuit is excited by regenerator output pulses to provide enabling trigger signals to the repeater input 6. Thus, the timing circuit establishes a fixed time relationship between arrival input signals and regenerated output pulses.

The repeater output is coupled through a second output transformer $T_3$ to a new section of transmission line 2'. From the secondary side of that second output transformer, a portion of the regenerator output energy is fed back through a path 9 comprising an adjustable resistance network 8 to the primary side of the input transformer $T_2$ in a sense opposing the distortion imposed upon the arrival waves.

The invention provides, in addition, a second path 17 from the output 7 of the pulse repeater through an adjustable resistance network 18, a capacitor 19, and a fixed resistive network 20 to the input 6 of the repeater. Now, neglecting the effect of energy fed back from the repeater through either feedback path 9 or 17, considering, for simplicity, the time interval after the nominal expiration of an electrical pulse arriving at the repeater from the source, and making other simplifying assumptions, a pulse transmitted from the source 1 appears at the repeater 3 as a voltage which is given as a function of time, $E(t)$, by the expression $$E(t)=k_1e^{-\alpha_1 t}+k_2e^{-\alpha_2 t} \qquad (1)$$

where $k_1$ and $k_2$ are constants depending on various circuit parameters; $e$ is the base of natural logarithms; $t$ represents time from an origin at the nominal expiration point of an arrival pulse; and $\alpha_1$ and $\alpha_2$ are numerical constants respectively dependent upon the response characteristics of the output transformer $T_1$ and input transformer $T_2$ taken together with their associated circuit resistances not shown in detail.

Physically, this Equation 1 signifies that the transmission channel interconnecting the source and the repeater has extended the trailing edges of the arrival pulses with two additive waves dependent in form on the values of $\alpha_1$ and $\alpha_2$. If those values be suitable and if a larger interval of time than that hypothesized be considered Equation 1 becomes transformed to represent degradations imposed on leading edges of the individual pulses or on the envelope of a succession of pulses, i. e., a "wandering zero."

The invention, by the employment of the lower feedback path 9, comprising the resistive network 8, the input transformer $T_2$ and the output transformer $T_3$ derives from an output pulse of the repeater a compensating wave. The wave derived by the path shown in Fig. 1 is characterized by two decay components; by a first component, of no significance for the moment, and by an exponential decay component of a rate and of an amplitude corresponding to a degradation wave component given by Equation 1, say that component given by the term $$k_1e^{-\alpha_1 t}$$

This desired wave is applied by the crossed connections of the lower feedback path in opposite sense to the arrival wave at the input 6 of the repeater. Thus the degrading effect upon the arrival wave of this component is eliminated and the repeater is triggered with greater certainty.

But still the degradation wave component given by $$k_2e^{-\alpha_2 t}$$

remains to prejudice the informational accuracy of arriving pulse trains.

The invention provides a second, dissimilar feedback path 17 to eliminate any effects of this latter distortion wave on the certainty of the repeater being triggered by the arrival wave. The resistance values of the network 18 are chosen in relation to the value of the capacitor 19 so that the second degradation wave, that represented by the $$k_2e^{-\alpha_2 t}$$

term of Equation 1 is compensated exactly.

Now the lower feedback path 9 comprising as it does the second output transformer $T_3$ and the input transformer $T_2$ derives from output pulses of the repeater not one, but two exponential decay waves. The one of these, that having its origin in the second output transformer $T_3$, is preferably established in compensating relation with that degradation wave associated with the first output transformer $T_1$ by suitable adjustment of the resistance values of the network 8. The other derived wave, associated with the input transformer $T_2$ is characterized by a decay term having a rate closely related to that of the second degradation wave. Adjustment of the single resistive network 8 to compensate for the first degradation wave does not, however, permit the compensation of the second degradation wave by the lower feedback path. For the fixing of the amplitude and decay rate of the one derived wave in a compensating relation to the first degradation component fixes the other derived wave arbitrarily and no complete compensation is possible employing the lower feedback path alone. The second feedback path 17 provided by the invention necessarily must cooperate with the first feedback path 9 to render complete compensation of the arrival wave degradation.

This necessity is seen in relief if it be assumed that the coupling transformers $T_1$, $T_2$, and $T_3$ of Fig. 1 are of identical values, a practical case. Then the degradation wave components may have identical decay rates and the compensating waves, derived from the repeater output pulse by the lower feedback path, may similarly be adjusted to have the same decay rates, i. e., $\alpha_1=\alpha_2$. Recognizing that these linear distortion components are additive, it appears at first glance that suitable choice of resistance values in the network 8 of the lower feedback path 9 permits an exact compensation of the arrival degradation waves.

This appearance is misleading for the like decay rates characterizing the two arrival wave degradation components signify a transformation of Equation 1 into a new representation of the arrival wave as given by the expression $$E(t)=k_1e^{-\alpha_1 t}+tk_2e^{-\alpha_1 t} \qquad (2)$$

Accordingly, the degradation component having a variable coefficient, i. e., the component given by $$tk_2e^{-\alpha_1 t}$$

requires a compensating wave separate from that of the component having a constant coefficient. And, as in the simpler case considered previously, the embodiment of Fig. 1 provides the required waves for exact compensation. First, the resistance network 8 of the lower feedback path is established at a value such that, in conjunction with reactive elements of the path, it impresses on repeater output pulses a decay wave which gives exact compensation for the degradation component having a variable coefficient in the representation of Equation 2, i. e.

$$tk_2e^{-\alpha_1 t}$$

and, thereafter, the resistive network 18 of the upper feedback path network is set to establish exact compensation for the constant coefficient degradation component. In this fashion, the embodiment of the invention shown in Fig. 1 eliminates any distortion effect on the arrival wave of any two degradation wave components expressible in terms of real exponential terms. By logical extension the invention can be thus employed to remove any multiplicity of such degradation components.

The degradation wave components which afflict arriving pulse trains, however, need not be of such form that they are mathematically expressible in terms of real exponential decays. Transmission channels may well comprise elements that impress upon pulse trains an oscillatory degradation wave. To negative the effect of this kind of degradation, it is necessary to apply at the input point an oscillatory wave of like amplitude and exactly opposite phase relation. It appears immediately that a single feedback path might be adapted to derive a compensating oscillatory wave from repeater output pulses.

Indeed, such is the case if, but only if, the trailing edge of the output pulse be placed in a specific time relationship with the distorting arrival waveform. This necessarily implies that the output pulse length be determined, not by the overall system requirements, but instead by the dictate of an unwanted degradation component.

The invention avoids the necessity for thus arbitrarily establishing a pulse length. First it recognizes that a sine wave and a cosine wave having independently controlled amplitudes and a like fixed frequency, combine to yield a resultant wave oscillatory at the same fixed frequency and having a phase determined by the relative amplitude of the two component waves. With this recognition the invention provides suitable paths for establishing such sine and cosine waves under an excitation such as that provided by an output pulse of the invention's regenerative repeater.

Figure 2:
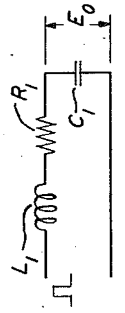

Fig. 2 shows one such path. A pulse wave applied to the input terminals of the circuit there shown acts upon the series resistor $R_1$, inductor $L_1$ and capacitor $C_1$ elements in familiar fashion to give an output voltage $E_0$ at the terminals of the capacitor in accordance with the expression $$E_0=k_3e^{\frac{-R_1t}{2L_1}}\sin(\beta_1t+\varphi) \qquad (3)$$

where $\beta_1$ is given by the expression $$\beta_1=\sqrt{\frac{1}{L_1C_1}-\left(\frac{R_1}{2L_1}\right)^2} \qquad (4)$$

where $k_3$ is a constant related to the amplitude of the applied input pulse and the resistive circuit parameters; and where $\varphi$ is an arbitrary angle chosen to represent the phase difference between the origin of the sine wave indicated in Equation 3 and some arbitrarily chosen time origin. Proper choice of the circuit elements shown in Fig. 2 leads to an establishment of $\beta_1$ at a convenient value.

Figure 3:
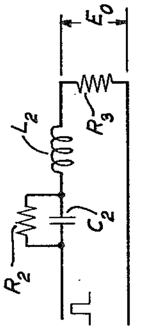
Figs. 2 and 3 are schematic circuit diagrams of use in the exposition of Fig. 4.

Fig. 3 shows a circuit complementary to that delineated in Fig. 2. If $$R_2=R_3$$

and $$\frac{L_2}{R_2}=CR_2$$

this circuit, under pulse excitation, provides a voltage output $E_0$ across the terminals of the load resistor in accordance with the formula $$E_0=k_4e^{-\frac{R_2t}{L_2}}\cos(\beta_2t+\varphi) \qquad (5)$$

where $$\beta_2=\frac{1}{\sqrt{L_2C_2}}$$

and may have the same value as the $\beta_1$ discussed in connection with Fig. 2, and where $k_4$ is a constant related to the circuit resistive parameters and to the amplitude of the pulse applied to the input terminals of the circuit shown.

Figure 4:
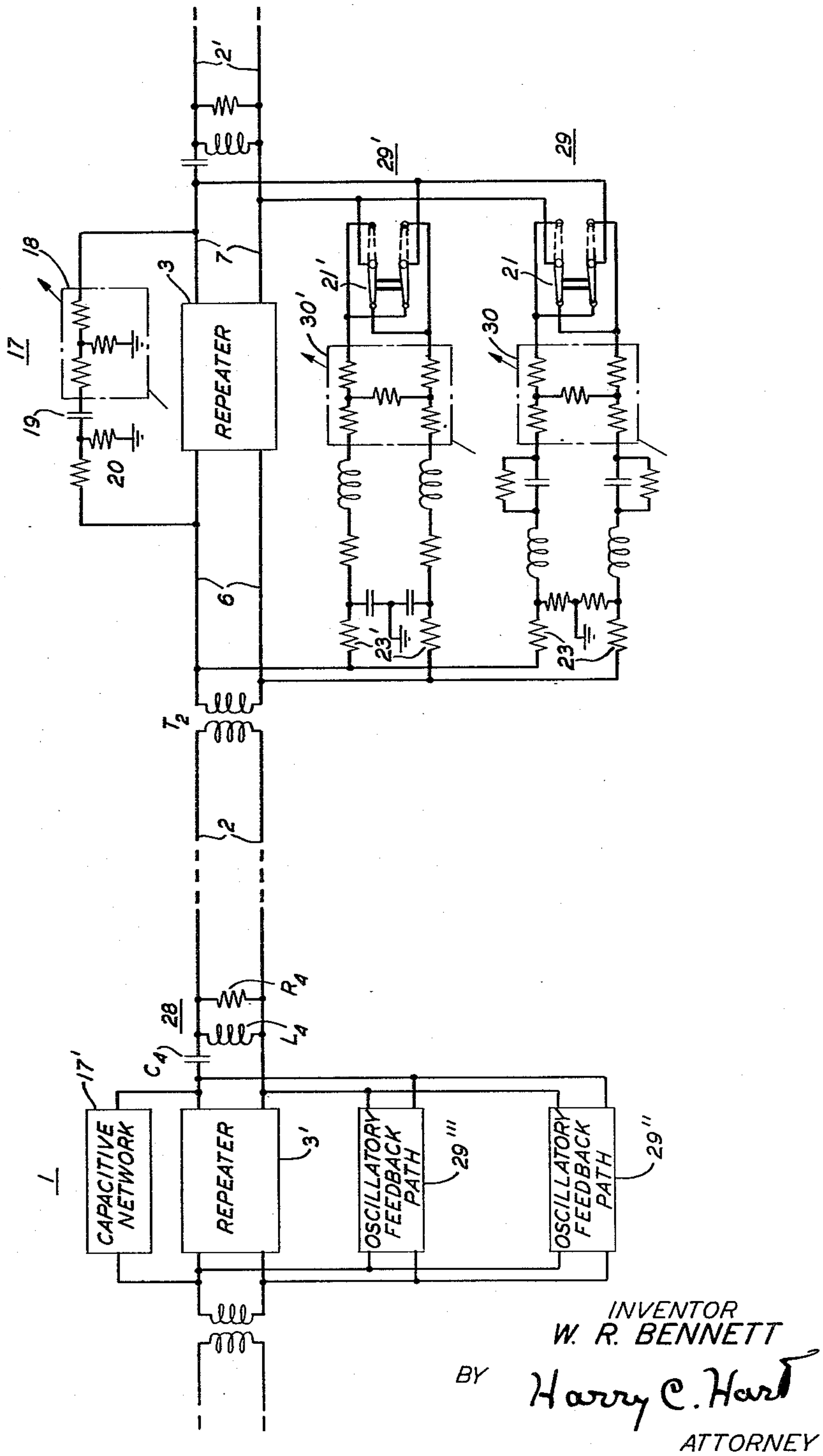
Fig. 4 illustrates diagrammatically a transmission system employing an embodiment of the invention which in turn employs adaptations of the circuits of Figs. 2 and 3.

In the preferred embodiment of Fig. 4, the invention employs a pair of circuits 29 and 29′, equivalent to those shown in Figs. 2 and 3, to compensate an oscillatory degradation impressed upon an arriving pulse train. In this embodiment circuit elements are chosen to establish $\beta_2$, in the case of the lower feedback path 29 and $\beta_1$, in the case of the feedback path 29′ next above, at a value denoting the same frequency as that of the degrading oscillation. A pulse source 1 comprising regenerative repeater 3′ and associated feedback paths 17′, 29″ and 29‴ supplies a train of pulses through an oscillatory coupling network 28, comprising a capacitor $C_4$, an inductance $L_4$ and a resistance $R_4$, to a transmission line 2. This transmission line is terminated in a coupling input transformer $T_2$ the secondary of which provides an input to a second regenerative repeater 3. From this second repeater, in turn, an output is taken to a new transmission line segment 2′. The resistor-capacitor feedback path 17, directly equivalent to the upper path of Fig. 1, provides compensation for the degrading component impressed upon the arriving pulse train by the input transformer $T_2$. But the oscillatory coupling network 28 further distorts the arrival wave with an exponentially damped oscillatory wave given by the expression $$E_2(t)=k_5e^{-\alpha_3t}\sin\beta t \qquad (6)$$

It has been stated in consideration of Figs. 2 and 3 that a wave of this form may be developed by the superposition of two waves themselves orientated in time quadrature and having a like frequency. Trigonometric development establishes that the proportion and sense in which these waves need be combined to compensate exactly a wave such as that expressed by Equation 6 are determined by the angular displacement $\varphi$ of these two waves from the wave to be compensated. More exactly, the amplitudes of the compensating sine wave and the compensating cosine wave must be related to the amplitude of the degradation sine wave component in the ratios of $-\cos\varphi$ and $\sin\varphi$ respectively.

Accordingly, the invention interconnects the output 7 of the second repeater 3 with its input 6 by means of a first feedback path 29′ balanced to ground but otherwise corresponding to the unbalanced sine wave path shown in Fig. 2. In parallel with the first balanced path, the invention provides a second balanced cosine wave feedback path 29 corresponding to the unbalanced circuit shown in Fig. 3. Component values in these circuits are chosen to yield an oscillatory response corresponding in frequency to the distorting wave and having a damping component similarly related to the degradation wave. Reversing switches 21 and 21′ are provided at the input of each of the feedback paths to account for sense changes dictated by variations in the phase angle $\varphi$ of Equations 3 and 5. Thus, with the switches in the position shown, a phase angle $\varphi$ lying in the range from $3\pi/2$ to $2\pi$ is accommodated.

Attenuating networks 30 and 30′ are provided in each of these parallel paths for establishing the above indicated proportionality between the oscillatory degradation amplitude and the amplitudes of the derived sine and cosine waves. In each of the feedback paths, too, there are provided isolating resistors 23 and 23′ to eliminate any substantial impedance mismatching effect of the feedback paths on the transmission system as a whole.

Proceeding even further, the invention takes advantage of the fact that not only quadrantally related oscillatory waves combine to negative a third wave of the same frequency. Indeed, any two waves fixed in frequency, but separately differing in time phase from a third oscillatory wave of the same frequency if correctly proportioned in amplitude and combined in a proper sense negative that third wave.

Figure 5:
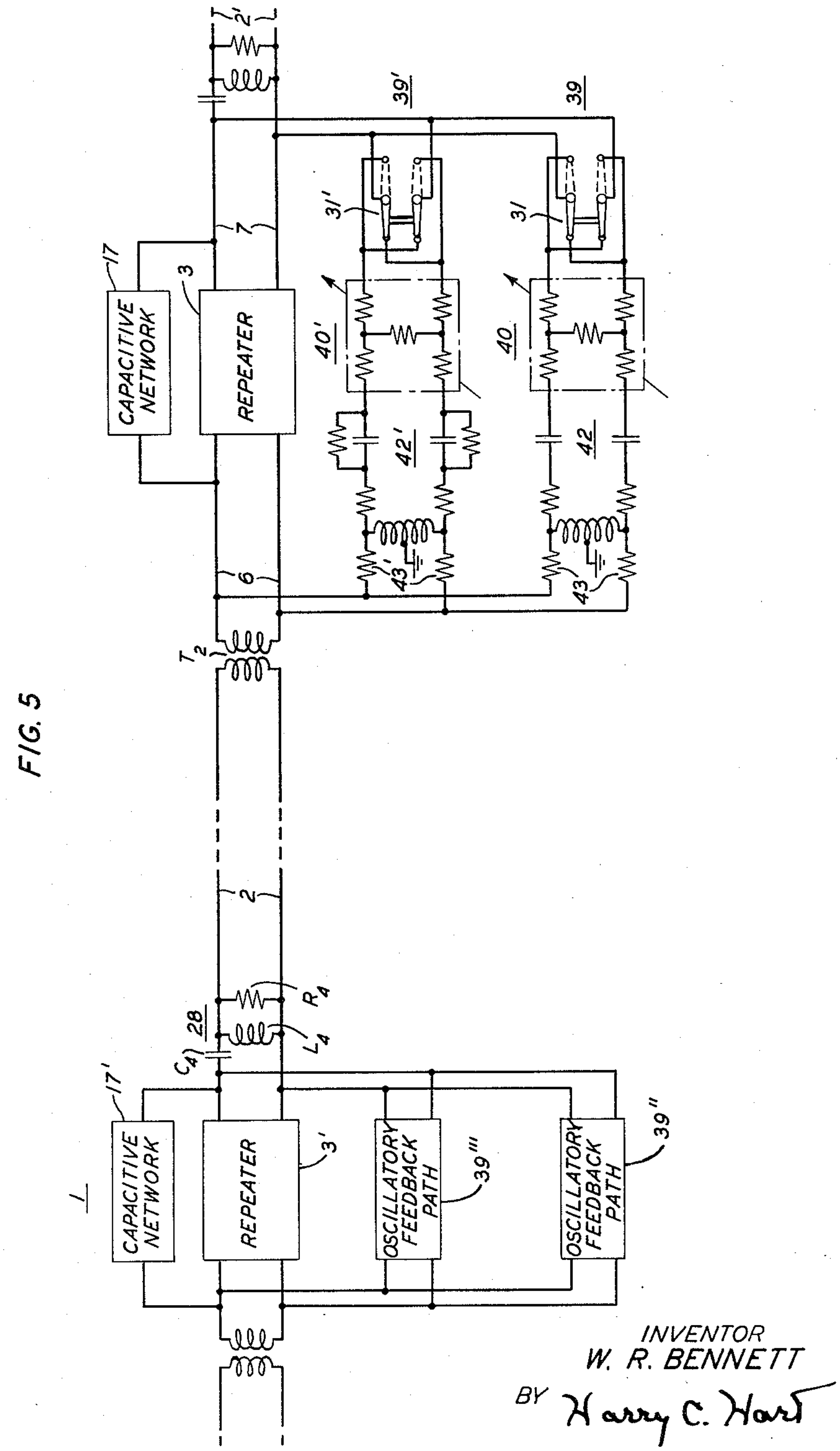
Fig. 5 illustrates an embodiment of the invention which employs a more generalized structure than that of Fig. 4.

In Fig. 5 there is shown a transmission system for the most part directly equivalent to that of Fig. 4, but with the important distinction that the two feedback paths 39 and 39′ shown in Fig. 5 derive oscillatory waves which may be, but in general are not, quadrantally related in time phase. As in the embodiment of Fig. 4, a pulse source 1 supplies a train of pulses through an oscillatory coupling network 28 to a transmission line 2, thence, through a coupling transformer $T_2$ to a second regenerative repeater 3, whence an output is taken to a new transmission line 2'. As in the embodiments shown in Figs. 1 and 4, the upper capacitive feedback path 17 derives from repeater output pulses a wave to compensate for the degradation impressed upon the arriving pulse train by the coupling transformer $T_2$; as in the embodiment of Fig. 4, a portion of the regenerated output pulses are fed through reversing switches 31 and 31' and amplitude proportioning resistance networks 40 and 40' to balanced oscillatory networks 42 and 42'. From these latter networks a compensating output is taken through isolating resistors 43 and 43' to the input 6 of the regenerative repeater 3.

To achieve the exact cancellation of the oscillatory degradation, the proportioning resistances in the upper feedback path 39' and in the lower feedback path 39 are set to values such that the amplitude $A_U$ of the wave derived by the upper feedback path is given by $$A_U=\frac{\sin \varphi}{\sin (\gamma-\varphi)} \qquad (7)$$

and the amplitude $A_L$ of the wave derived by the lower feedback path is given by $$A_L=\frac{\sin \gamma}{\sin (\varphi-\gamma)} \qquad (8)$$

where the phase angles of waves derived from the repeater output pulse by the two oscillatory feedback paths are given with respect to the arrival degradation wave by $\varphi$ and $\gamma$ respectively; where the amplitude of the degradation oscillation is considered as unity; where the oscillatory frequencies of both the upper and lower feedback networks are established to coincide with the frequency of the oscillatory degrading component of the arrival wave; and where the exponential damping components affecting all three of the oscillatory waves under consideration are equalized by proper choice of feedback path circuit elements.

These embodiments illustrate some of the ways in which the invention's plural feedback paths, taken together with its regenerative repeater, operate to eliminate any prejudicial linear distortion effect upon a pulse transmission system's reliability. In no sense, however, is the spirit of the invention limited by these illustrative embodiments.

What is claimed is:

1. Apparatus for communication by trains of On and Off pulses which comprises a source of a train of On and Off pulses, a pulse repeater responsive to incoming signals above a threshold level for generating output pulses in a fixed time relationship to incoming pulses, said repeater having an input circuit and an output circuit, a transmission channel interconnecting said source with said input circuit, said transmission channel having a non-uniform frequency transmission characteristic, whereby a waveform degradation comprising a plurality of time varying components is impressed upon pulses arriving at said input circuit, feedback means interconnecting said output circuit with said input circuit for deriving from said output pulses a plurality of waves, each of said derived waves comprising a component corresponding in variation rate to one of said time varying components, means for proportioning the amplitudes of said derived waves in relation to the amplitude of said degradation, means for combining said derived waves and means for applying said combined waves in opposing relation to said degradation, whereby pulse trains arriving at said input point are restored to their original form.

2. Apparatus as set forth in claim 1 wherein said channel is characterized by a resonance at a frequency of interest, whereby said degradation comprises an oscillatory component at said frequency, and wherein said wave deriving means comprises means for deriving a sine wave at said frequency.

3. Apparatus as set forth in claim 2 wherein said wave deriving means comprises means for deriving a sine wave and means for deriving a cosine wave whereby, under the influence of said proportioning means, said sine wave and said cosine wave combine to form a sinuous wave in time coincidence with said oscillatory degradation component.

4. Apparatus as set forth in claim 3 wherein said derived sine wave is related in phase to said oscillatory degradation component by an angle $\theta$ and wherein said proportioning means comprises means for relating the amplitudes of said derived sine wave and of said derived cosine wave in the ratio $-\cot \theta$, whereby said sine wave and said cosine wave combine to form a sinuous wave in opposing time coincidence with said oscillatory degradation component.

5. Apparatus as set forth in claim 4 wherein said proportioning means comprises means for relating the amplitude of said derived sine wave to the amplitude of said oscillatory degradation component in the ratio of $\sin \theta$, whereby said sine wave and said cosine wave combine to form a sinuous wave for cancelling said oscillatory degradation component.

6. Apparatus as set forth in claim 1 wherein said channel is characterized by an oscillatory resonance at a frequency of interest, whereby said degradation comprises an oscillatory component at said frequency, and wherein said wave deriving means comprises means for deriving a first sine wave separated in phase from said oscillatory degradation component by an angle $\varphi$, and means for deriving a second sine wave separated in phase from said oscillatory component by an angle $\gamma$, and wherein said proportioning means comprises means for relating the amplitude of said first derived sine wave to the amplitude of said second derived sine wave in a ratio $$-\frac{\sin \gamma}{\sin \varphi}$$

whereby said derived sine waves combine to form a compensating sine wave in opposing time coincidence with said oscillatory degradation component.

7. Apparatus as set forth in claim 1 wherein said channel is characterized by an oscillatory resonance at a frequency of interest, whereby said degradation comprises an oscillatory component at said frequency, and wherein said wave deriving means comprises means for deriving a first sine wave separated in phase from said sine wave degradation component by an angle $\varphi$, and means for deriving a second sine wave separated in phase from said sine wave component by an angle $\gamma$, and wherein said proportioning means comprises means for relating the amplitude of said first derived sine wave and the amplitude of said second derived sine wave to the amplitude of said oscillatory degradation in the ratios $$\frac{\sin \gamma}{\sin (\varphi-\gamma)}$$

and $$\frac{\sin \varphi}{\sin (\gamma-\varphi)}$$

respectively, whereby said derived sine waves combine to cancel said oscillatory degradation component.

8. Apparatus for communication by trains of pulses which comprises a source of a train of On and Off pulses, a pluse repeater responsive to input signals above a threshold level for generating output pulses and having an input point and an output point, a coupling element interconnecting said source with said input point and having a response characteristic which introduces into each pulse train a degradation oscillatory at a frequency of interest and damped at a fixed rate, feedback means interconnecting said output point with said input point which comprises means for deriving from said output pulse a sine wave damped at said fixed rate and oscillatory at said frequency, and means for deriving from said output pulse a cosine wave damped at said fixed rate and oscillatory at said frequency, means for proportioning the amplitudes of said derived waves throughout a full range of values including zero, and means for combining said proportioned waves whereby said derived waves are applied to said input point in compensating relation to said damped oscillatory degradation.

9. Apparatus as set forth in claim 8 wherein said sine wave deriving means comprises means for deriving a sine wave differing in phase from said damped oscillatory degradation by an angle $\theta$ and wherein said proportioning means comprises means for relating the amplitudes of said sine wave and said cosine wave in the ratio $-\cot\theta$, whereby said sine wave and said cosine wave combine to form a damped sinuous wave in opposing time coincidence with said oscillatory degradation.

No references cited.